United States Patent [19]
Tobiasz

[11] Patent Number: 5,477,682
[45] Date of Patent: Dec. 26, 1995

[54] HYDRAULIC MASTER CYLINDER AND RESERVOIR ASSEMBLY

[75] Inventor: Andre Tobiasz, Epinay-sur-Seine, France

[73] Assignee: Automotive Products France, SA, Cergy Pontoise, France

[21] Appl. No.: 256,818

[22] PCT Filed: Jan. 25, 1993

[86] PCT No.: PCT/EP93/00153

§ 371 Date: Jul. 25, 1994

§ 102(e) Date: Jul. 25, 1994

[87] PCT Pub. No.: WO93/14963

PCT Pub. Date: Aug. 5, 1993

[30] Foreign Application Priority Data

Jan. 27, 1992 [FR] France ................... 92 00835

[51] Int. Cl.[6] .................. F15B 7/00; B60T 11/26
[52] U.S. Cl. .................. 60/583; 60/585; 92/98 D
[58] Field of Search .................. 60/533, 568, 583, 60/585, 589; 92/28 D

[56] References Cited

U.S. PATENT DOCUMENTS

| | | | |
|---|---|---|---|
| 4,779,713 | 10/1988 | Tomala et al. | 92/98 D X |
| 5,052,279 | 10/1991 | Limbacher et al. | 60/533 X |
| 5,107,680 | 4/1992 | Hojnacki et al. | 60/533 |
| 5,138,936 | 8/1992 | Kent | 92/98 D |

FOREIGN PATENT DOCUMENTS

| | | |
|---|---|---|
| 2624088 | 12/1976 | Germany . |
| 3631683 | 3/1988 | Germany . |
| 1539879 | 2/1979 | United Kingdom . |

*Primary Examiner*—Edward K. Look
*Assistant Examiner*—Hoang Nguyen
*Attorney, Agent, or Firm*—Paul E. Milliken; Lee A. Germain

[57] ABSTRACT

A hydraulic master cylinder and reservoir assembly having a master cylinder body with a fluid reservoir, and a master cylinder bore with a piston assembly sealingly reciprocal within the bore. The fluid reservoir has at least a portion thereof concentric with the master cylinder bore and is sealed from the atmosphere by a rolling diaphragm, which is sealingly slidable relative to an internal surface of the reservoir allowing the volume of fluid within the reservoir to expand or contract.

19 Claims, 2 Drawing Sheets

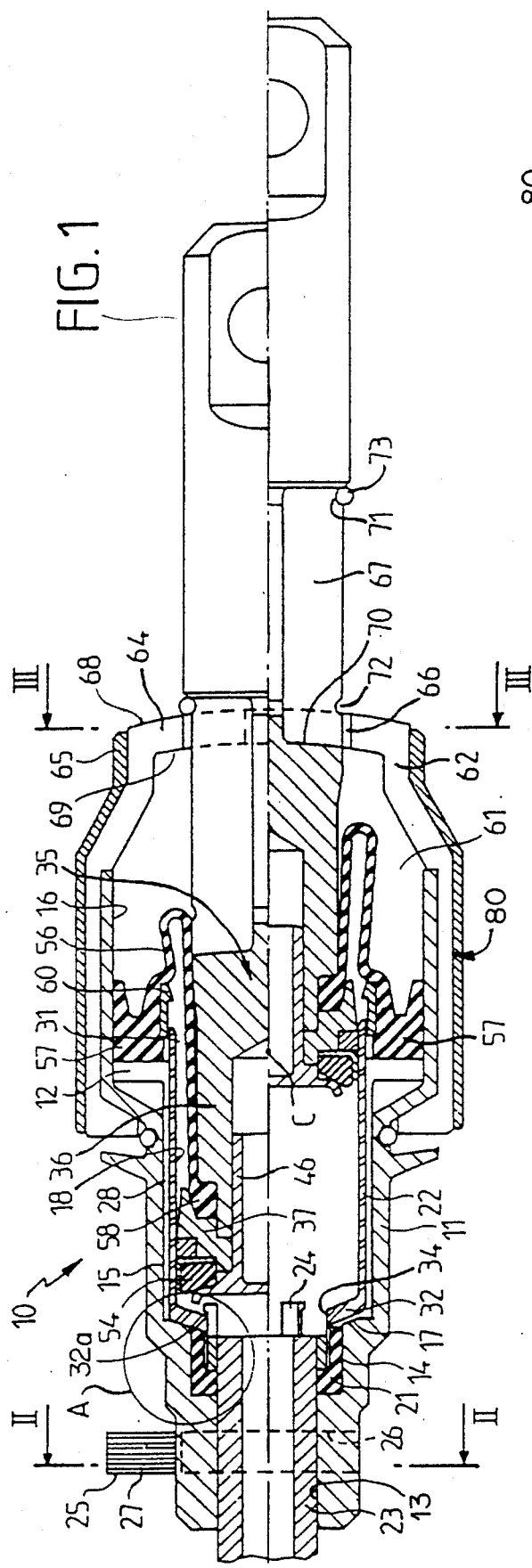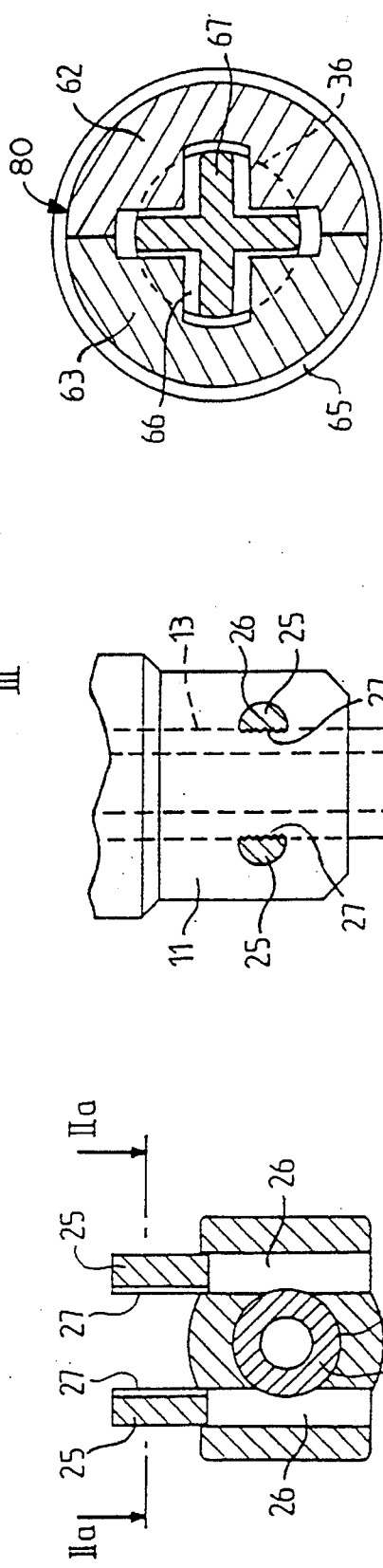

5,477,682

HYDRAULIC MASTER CYLINDER AND RESERVOIR ASSEMBLY

This invention relates to a hydraulic reservoir and master cylinder assembly in particular for hydraulic systems on automobiles.

It is known from GB-A-1539879 to provide a hydraulic clutch control system comprising a master cylinder, a reservoir, and a slave cylinder which are assembled together with conduit, and then the entire system is filled with hydraulic fluid prior to installation on a vehicle.

The present invention relates to a master cylinder and reservoir assembly which is particularly suitable for use in a pre-filled hydraulic clutch control system.

The present invention provides a compact, cheap master cylinder-/reservoir assembly.

Accordingly there is provided a hydraulic master cylinder and reservoir assembly having a master cylinder body with a fluid reservoir, and a master cylinder bore with a piston assembly sealingly reciprocal within the bore, the assembly being characterised in that the fluid reservoir having at least a portion thereof concentric with the master cylinder bore and being sealed from atmosphere by rolling diaphragm, the inner periphery of the diaphragm being sealed to the piston assembly, and the outer periphery of the diaphragm being sealingly slidable relative to an internal surface of the reservoir allowing the volume of fluid within the reservoir to expand or contract.

It is an advantage of this construction that no sliding piston seal is in direct contact with the atmosphere.

The primary seal directly separates the pressure chamber from the reservoir chamber and the classic secondary seal is replaced by the deformable diaphragm which is substantially stationary during piston reciprocation and is airtight.

The master cylinder body may include a cylindrical liner spaced from the internal wall of the body forming a chamber therebetween, said chamber constituting a part of the reservoir.

The metal liner may have a mouth at one end and an end wall at the other end, the liner being capable of limited axial movement in the body, and the end wall of the liner forming a recuperation valve controlling the flow of hydraulic fluid between the master cylinder bore and the reservoir.

It is an advantage for the liner to be both rigid, of metal or other material, and of a material of low elasticity, and in this latter case, for the liner to be provided with a calculated functional play, and supported by the body after a slight expansion due to the effect of the pressure.

The master cylinder may have an outlet port which receives a conduit in form of a plastic flexible pipe, the conduit being retained in position is the outlet port of the hydraulic master cylinder and reservoir by chordal pins that cut into the external surface of the conduit as the pins are forced into position.

The piston assembly may comprise a push rod, a seal retainer which is an interference fit on the push rod, and a piston primary seal which is located co-axially between the push rod and the seal retainer.

The piston assembly may be sealed to the bore by a primary seal comprising a seal ring, preferably an elastomeric ring seated in a cup, preferably PTFE, which supports the radially outer peripheral surface of the elastomer ring and its side adjacent the piston, the outer peripheral margin of the cup being supported by a backing ring, preferably a PTFE backing ring (PTFE=polyfluroethylene).

This seal allows the piston assembly to tilt relative to the axis of the bore.

The outlet portion of the master cylinder body may be surrounded by an annular seal, which co-operates with a portion of the end wall of the liner to regulate the flow between the reservoir and the master cylinder bore.

The annular seal is kept in position by a coaxial ring clip at the outlet port, and this clip serves to limit the axial movement of the liner in the master cylinder body.

In another configuration of the invention, the outlet port of tile master cylinder body receives the conduit which is a force fit, the outlet port having annular ribs therein to grip and retain the conduit and seal said conduit into the outlet port. This arrangement cooperates with a portion of the liner end wail to regulate the flow between he reservoir and the master cylinder bore. The airtightness is reinforced by the presence of an annular band or sealing flange which is located on the shoulder of the body, and which also cooperates with the liner end wall.

In a preferred arrangement of the invention, the reservoir is circled and enclosed in a housing which completely covers the part of the hydraulic master cylinder to be protected from the outside environment. In this design, the housing is made up of at least two cuplike shields, whose internal configuration conforms to the shape of the body in order to exactly cap it in the area of the reservoir and its mouthpiece. The cuplike shields are kept in place by an outer casing. These assembled shields have an outer wall which has a cruciform section aperture which accommodates a cruciform section of the push rod in such a way as to ensure the direction of this rod.

Preferably the sealing system of the piston assembly and the inside of the bore are arranged to allow the piston assembly to oscillate around a point on the axis of the master cylinder, said point being approximately at the intersection with the sealing plane of the seal system.

In this preferred execution of the invention, the end wall of the shields has a spherical outer face, and a spherical inner face which matches up with the spherical abutment face of the push rod of the piston assembly. These different spherical parts have as an approximate centre the previously defined point, in such a way that at one inner limit of movement of the push rod, an annular spring clip comes to abut with the spherical outer face and that, at the other outer limit of movement, the spherical abutment face of the push rod comes into abutment with the spherical inner face. The preset play, according to the invention, between the cruciform opening of the outer wall and the crosspiece of the push rod give the possible oscillations of the piston assembly in relation to the body of the master cylinder.

Other characteristics and advantages of this invention will be evident from the following description, which is given by way of example only, with reference to the accompanying drawings in which:

FIG. 1 is a longitudinal cross section through an integrated and sealed master cylinder and reservoir assembly according to this invention, which shows above the centre line the master cylinder in operational condition, and below the centre line the master cylinder in the at-rest condition.

FIG. 2 is a cross section following the II—II line of FIG. 1 and FIG. 2a is a partial view following 2a of FIG. 2.

FIG. 3 is a cross section through III—III of FIG. 1.

Figure 4:
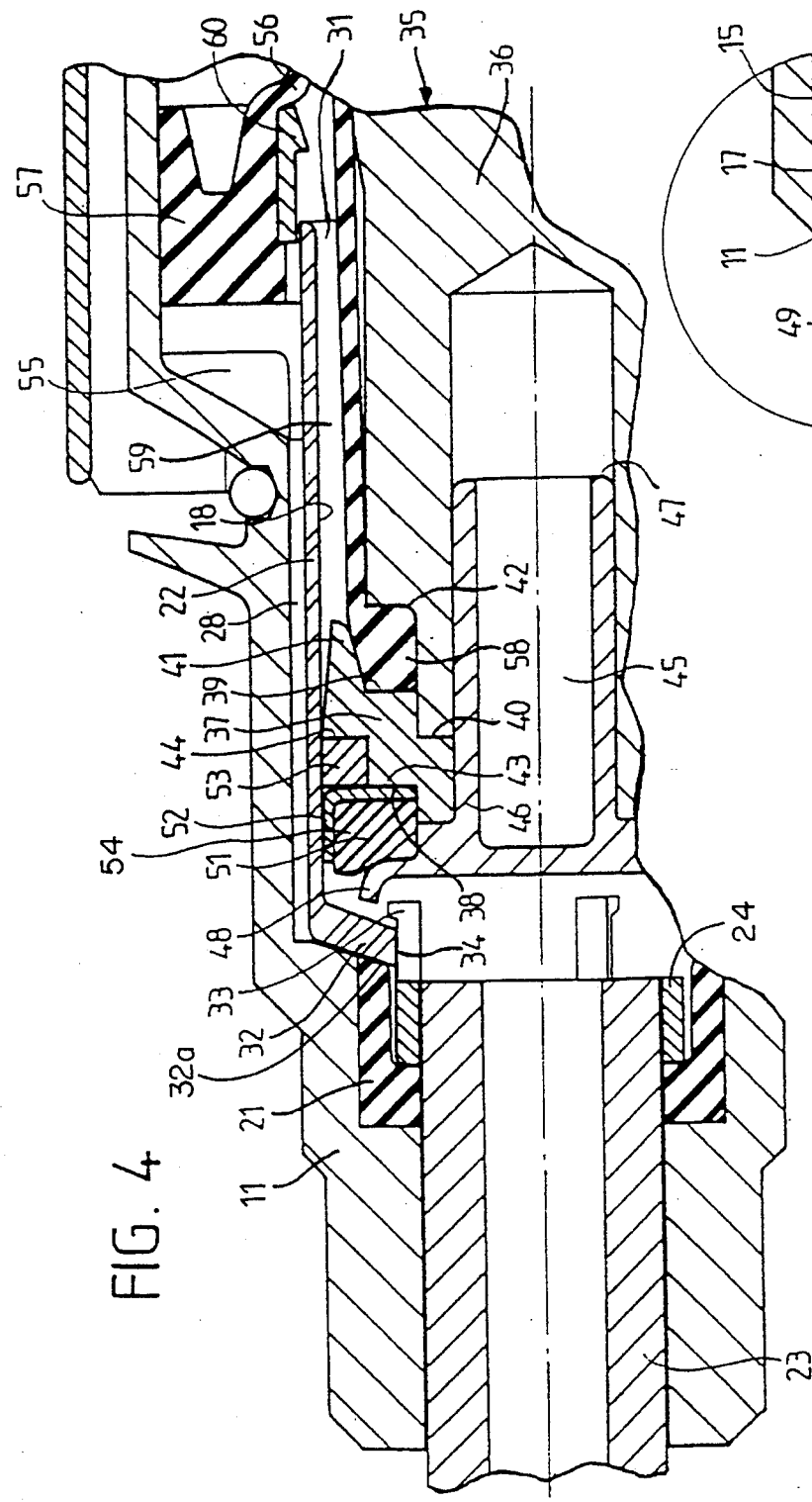
FIG. 4 is an enlargement of a part of FIG. 1.

With reference to FIGS. 1, 2, and 3 there is shown a hydraulic master cylinder and reservoir assembly 10 comprising a master cylinder body 11 with coaxial reservoir tank 12 for fluid formed integrally therewith. The master cylinder body 11 and reservoir tank 12 are formed from a single moulding preferably of plastic material such as nylon 6 or nylon 66 and basically comprises a stepped through bore having different diameter co-axial portions 13–16.

The smallest diameter portion 13 provides of the body 11 is the master cylinder outlet port 13, the adjacent larger diameter portion 14 provides a seat for an annular seal 21, the adjacent still larger diameter portion 15 houses a metal cylindrical liner 22, and the largest diameter portion 16 forms the fluid reservoir tank 12.

The outlet port 13 receives a flexible conduit 23, preferably nylon 12 tube, which axially extends into the adjacent larger diameter portion 14 of the bore. The axially inner end of the conduit 23 has a resilient clip 24 thereon and the conduit 23 is sealed in the outlet 13 by the seal 21. The seal 21 is retained in its larger diameter portion 14 of the bore by the clip 24 and the conduit 23 is secured in the outlet port 13 by a pair of chordal pins 25, best seen in FIGS. 2 and 2a.

The pins 25 are formed integrally with the master cylinder body 11 and are moulded in the position shown in FIG. 2 being joined to the body by thin membranes. After the insertion of the conduit 23, the pins 25 are pushed axially into co-operating holes 26 by means of a suitable clamping tool. The pins have flutes 27 thereon that cut into the outer surface of the conduit 23 thereby securing it in position.

The shoulder 17 between the two different diameter portions 14,15 of the bore is in the form of frustoconical surface, and the outlet port seal 21 extends axially to intercept the plane of frustoconical shoulder 17. The larger diameter portion 15 adjacent the reservoir tank 12 houses the cylindrical liner 22. The liner 22 is formed from an aluminium pressing and is held spaced from the internal surface of the master cylinder body by circumferentially spaced axial ribs forming a fluid chamber 28 between the outer surface of the liner 22 and the master cylinder body 11.

Alternatively, the liner 22 is made of material of low elasticity, and is mounted with a functional play which is calibrated so that the liner 22 is supported by the body 11 after slight expansion due to hydraulic pressure.

The internal surface of the liner 22 constitutes the master cylinder bore 18 and the liner 22 extends axially into the reservoir tank 12 and has an open mouth 31 at the end adjacent the reservoir tank 12, and an end wall 32 at the other end adjacent the shoulder 17. The liner end wall 32 has a frusto conical shape that matches the frusto conical shape of the shoulder 17, so that the end wall can seat against the seal 21 when the end wall 32 is in abutment with the shoulder 17 as shown in the upper portion of FIG. 1. The end wall 32 has a coaxial hole 34 therein which receives the seal retaining clip 24. The clip 24 has three lugs 33 spaced equally and which extend radially outwards and limit the movement of the liner 22 away from the seal 21 but allows the end wall 32 to separate from the seal 21 to allow fluid to flow therebetween. Thus the seal 21 and end wall 32 form a recuperation valve 32a which opens and closes with the movement of the liner 22, temporarily linked to the piston assembly 35 by the friction existing between the airtight system of this piston assembly and the master cylinder bore 18 of the liner 22. The movement of the liner 22 determines the amount of free travel of the push rod before the hydraulic system begins to operate.

Figure 5:
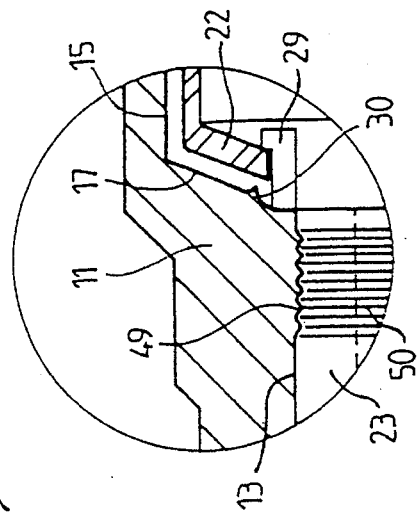
FIG. 5 is another means of showing area A in FIG. 1.

A variation in the realisation of the invention is shown in FIG. 5. In this configuration, the body 11 of the master cylinder has a coaxial outlet port 13, which receives a conduit 23 which is a force fit by its portion 50 into the annular deformations of mini-sealing ribs 49 which are fitted into the coaxial outlet port 13, and which cooperate with a portion of the end wall 32 of the liner 22 to regulate flow between the reservoir tank 12 and the master cylinder bore 18. In addition, the body 11 of the master cylinder possesses on its shoulder 17 an annular band or mini-sealing flange 30, which cooperates with the end wall 32 of the liner 22 in order to further improve the airtight system. The master cylinder body 11 is provided with three lugs 29, which are set at equal distances one from the other inside the extension of the coaxial outlet port 13. The lugs 29 come to grip inside the coaxial opening 34 of the end wall 32, in such a way as to limit the axial movement of the liner 22 in the master cylinder body 11.

The master cylinder body liner 22 houses the piston assembly 35 (best seen in FIG. 4) which comprises a push rod 36, a piston body 37 and a primary seal 54. The push rod has a blind bore 45, the open end of which is directed towards the opening 34 in the end wall 32. The piston body 37 of the piston assembly 35 is mounted on the axially inner end of the push rod 36. The annular piston body 37 has a front face 38 which receives the primary seal 54, and a rear face 39 which abuts against the push rod 36.

The rear face 39 of the piston body 37 has a central recess 40 which receives the end portion of the push rod 36 and has outer rearwardly extending annular lip 41. The radially outer surface of the end portion of the push rod 36 is stepped to provide a shoulder 42. The front face 38 of the piston body 37 is stepped to provide a radially inner annular shoulder 43 and a radially outer annular shoulder 44 which is set axially behind the shoulder 43.

The piston body 37 has a central coaxial hole which aligns with the blind bore 45 in the push rod 36 and the piston body 37 is secured to the push rod 36 by a seal retainer 46 comprising a coaxial stem 47 which is an interference fit in the blind bore 45, and a radially outwardly projecting flange 48 thereon. The seal retainer 46 holds the primary seal 54 on the piston body 37, when it is fully located in the blind bore 45 and is in abutment with the front face of the piston body 37.

The hydraulic master cylinder and hydraulic reservoir assembly 10 according to the invention, thus comprise a hydraulic master cylinder and a reservoir tank 12 for a fluid which is integral with the master cylinder body 11. The master cylinder has an outlet port 13 made airtight with regard to the atmosphere. The master cylinder bore 18 houses the piston assembly 35 which can be moved by means of the push rod 36. The piston sealing system in relation to the bore 18 of the master cylinder is constituted by the primary seal 54. The seal 54 includes an annular elastic ring 51, generally in elastomer, retained in a PTFE (poly tetra fluro ethylene) cup 52 which seats on the the shoulder 43 on the front face of the piston body 37. The cup 52 is supported at its radially outer margin by a PTFE backing ring 53 which seats on the shoulder 44 on the front face 38 of the piston body 37. The cup 52 contacts the inner surface of the liner 22 and the annular ring 51 seals against the retainer flange 48, and against the cup 52.

The radially outer surface of the piston body 37 tapers radially inwardly from the master cylinder bore. This allows the piston body 37 to tilt when the push rod 36 moves off centre due to sideways movement at its outer end.

The fluid chamber 28 around the liner 22 opens into the chamber 55 of the reservoir tank 12. The reservoir fluid chamber 55 is sealed from the atmosphere by a rolling diaphragm 56 which has a radially outer peripheral bead 57 and a radially inner peripheral bead 58. The annular space 59 between the inner 22, and the diaphragm 56 inter-connects with the reservoir fluid chamber 55 and is itself filled with fluid. The outer bead 57 is in form of a annular seal which is held against the internal the internal surface of the reservoir tank 12 by an internal ring 60. The outer bead 57 is sealingly slidable within the reservoir 12 so that the fluid chamber 55 can expand or contract. The inner bead 58 is sealed to the piston body 37 and is secured between the flange 41 on the piston body 37 and the shoulder 42 on the push rod 36. The diaphragm 56 acts as a secondary seal preventing air from entering the master cylinder bore.

The reservoir 12 is surrounded and enclosed in a housing 80 which completely covers the portion of the master cylinder to be protected from the outside environment. This housing 80 is principally made up of cuplike parts 62–63 which are mounted on the body 11, which are kept in place by an outer casing 65. The cuplike parts of whatever number N are mounted on the body 11. In the method of execution shown in FIG. 1 and 3 there are two cuplike parts or half cups 62 and 63, whose inside configuration has a forms matching that of the body 11, in such a way that it exactly caps it in the area of the reservoir tank 12 with its mouth 61. The cuplike parts 62 and 63 are kept in place by the casing 65. Without departing from the scope of the invention, the cuplike parts 62 and 63 can be maintained by any method of fixing. The casing 65 and the cuplike parts 62 and 63 thus constitute the housing 80 covering completely the portion of the assembly to be protected from the external environment.

The cuplike parts 62 and 63 have an end wall 64 which includes a cruciform opening 66, which accommodates a cruciform section 67 of the push rod 36. The clearance between the cruciform opening 66 and the section 67 of the push rod 36 allows the oscillations of the push rod 36. These oscillations are principally effected in the section of FIG. 1, e.g. these are strokes as one can see it on FIG. 3. This end wall 64 has an outer spherical face 68, and an inner spherical face 69 which cooperates with a spherical abutment face on the push rod 36, which seats against the spherical inner face 69, when the push rod 36 is in the at-rest position. For that, the outer spherical face 68, the inner spherical face 69 and the spherical abutment face 70 of the push rod 36 have the same spherical centre C. This centre C is approximately in the seal plane of the primary seal 54, this seal plane located approximately in the central area of the periphery of the airtightness obtained.

The push rod 34 has two axially spaced grooves 71,72 therein which can accommodate an annular spring clip 73.

Below the centre line of FIG. 1, the master cylinder is shown in the at-rest condition. If the master cylinder forms part of a pre-assembled prefilled clutch actuation system, them during delivery and prior to use the spring clip 73 will be fitted within the groove 72 immediately adjacent the end wall 64 of the cups 62 and 63. This will help prevent accidental operation of the master cylinder.

If the push rod 36 is moved more axially inwardly by an actuation load on the clutch pedal the spring clip 73 is forced out of the groove 72 and the push rod moves axially inwardly. The friction between the primary seal 54 and the liner 22 ensures that the liner remains stationary relative to the piston seal 54, but is moved axially inwardly with the push rod 36 until the end wall 32 abuts the shoulder 17 and seats against the seal 21.

Further inwards movement of the push rod causes the piston seal 54 to displace fluid through the outlet port 13 for operation of the clutch slave cylinder. The radially inner bead 58 of the diaphragm 56 is moved axially into the liner 22 so that the diaphragm becomes concentric with the liner 22.

Assuming a full pedal travel, the ring 73 will now be transferred into the groove 71. This is the position shown above the centre line in FIG. 1.

On release of the clutch pedal the push rod will move out of the master cylinder under the bias of the clutch pedal return spring and the slave cylinder piston will be returned by the clutch spring and fluid will be displaced back into the master cylinder. The frictional engagement of the piston seal 54 on the liner 22 will move the end wall 32 away from the seal 21 opening the hydraulic system to the fluid chamber 28 and reservoir chamber 55 allowing the system to recuperate. This is the position now shown in the lower half of FIG. 1.

The hydraulic master cylinder according to the invention thus has an integrated reservoir which is sealed from the atmosphere. In addition the structure of this master cylinder assembly according to the invention allows for a recuperation valve 32a which is controlled by the change in direction of the movement of the piston due to the friction of the liner 22 with the primary seal 54, of the piston 35, which occurs regardless of the position of the piston. In addition, the recuperation valve 32a remains closed as long as the difference in pressure is sufficient to retain the valve 32a on its seating, e.g. the force due to the difference in pressure is greater than the friction between the primary seal 54 and the liner 22. Lastly, the cooperation existing between the sealing system of the piston assembly 35 and the inside of the bore 18 is determined in such a way that the piston assembly 35 may have the oscillations around a point belonging to the axis of the master cylinder. The primary seal 54 thus serves as a joint to the push rod 36.

According to FIG. 1 and 4, the parts being at rest, there exists between the liner 22 and valve 32a, an opening so that the pressure chamber connects with the reservoir tank chamber 28. On starting, the piston assembly axially moves the liner 22 by friction up to the contact with the valve 32a. From that moment the pressure begins to grow, the liner 22 being pushed by the pressure on its inner differential face, which ensures the airtightness for as long as the sum of the forces of pressure and of friction keep that same direction. On the return, at the end of the movement, the friction of the primary seal 54 of the piston assembly 35 on the liner 22 tending to open valve 32a is larger than the hydraulic pressure which tend to hold the valve closed and the liner 22, therefore, lifts to open the recuperation valve 32a. This ocurrs at a relatively low master cylinder pressure. A very small displacement of the liquid towards the reservoir tank due to the wear on gaskets can then take place. The outer peripheral bead of the rolling diaphragm 56 is, then, displaced as it goes along in its housing throughout the life of the equipment.

It must be added according to the invention, that the variable volume reservoir within predetermined limits is adaptable in the two directions e.g. the increasing direction and the diminishing direction, and this is due to its sliding seal controlled by the difference in pressure which is relatively weak. The structure of this invention with mobile liner 22 which constitutes the recuperation valve 32a, determines the depression which can appear in the system at a very low level. The reopening of the recuperation valve 32a always intervenes a little before the return to the initial position due to the friction of the piston and to the hysteresis in the system.

I claim:

1. A hydraulic master cylinder and reservoir assembly (10) having a master cylinder body (11) with a fluid reservoir (12), and a master cylinder bore (18) with a piston assembly (35) sealingly reciprocal within the bore, the assembly being characterised in that the fluid reservoir (12) has at least a portion thereof concentric with the master cylinder bore (18) and being sealed from atmosphere by a rolling diaphragm (56), an inner periphery (58) of the diaphragm being sealed to the piston assembly (35), and an outer periphery (57) of the diaphragm being sealingly slidable relative to an internal surface (16) of the reservoir allowing a volume of fluid within the reservoir to expand or contract.

2. An assembly according to claim 1 characterised in that the master cylinder comprises the master cylinder body (11) with a cylindrical liner (22) therein spaced from an internal wall (15) of the body forming a chamber (28) therebetween, said chamber constituting a part of the reservoir (12).

3. An assembly as claimed in claim 2 characterized in that the liner (22) has a mouth (31) at one end and an end wall (32) at the other end, and the liner is capable of limited axial movement in the body, thereby moving the end wall (32) of the liner and the seal cooperatively forming a recuperation valve to and from an annular seal (21), the end wall 32a controlling the flow of hydraulic fluid between the master cylinder bore (18) and the reservoir (12), the valve (32a) being opened and closed by movement of the liner (22).

4. A hydraulic master cylinder and reservoir assembly as claimed in claim 3 characterised in that the master cylinder body has a coaxial outlet port 13 which is surrounded by an annular seal (21), the seal co-operating with a portion of the liner end wall (32) to control the flow between the reservoir (12) and the master cylinder bore (18).

5. An assembly as claimed in claim 4 characterised in that the annular seal (21) around the outlet port (13) is held in position by an annular clip (24) coaxial with the outlet port, and the clip serves to limit the axial movement of the liner (22) in the master cylinder body (11).

6. An assembly as claimed in claim 1, characterised in that the master cylinder has an outlet port (13) which receives a conduit (23) in the form of a plastics flexible pipe, and the conduit is retained in position in the outlet port 13 by means of chordal pins (25) that cut into the external surface of the conduit as the pins are forced into position.

7. An assembly as claimed in claim 6 characterised in that the pins (25) are formed integrally with the master cylinder body (11) and are dislocated from one position to another to retain the conduit (23).

8. An assembly as claimed in claim 1 characterised in that the master cylinder has an outlet port (13) which receives a conduit (23), the outlet port having annular ribs (49) therein to grip and retain the conduit and seal said conduit.

9. An assembly as claimed in claim 1 characterised in that the master cylinder body (11) has an internal shoulder (17) adjacent the outlet, the shoulder having an annular sealing flange (30) formed integrally therewith for cooperation with the end wall (32) of the liner (22).

10. An assembly as claimed in claim 1 characterised in that, the piston comprises a push rod (36), and a seal retainer (46) which is an interference fit on the push rod, and the piston primary seal (54) is located axially between the push rod (36) and the seal retainer (46).

11. All assembly as claimed in claim 1 characterised in that the piston assembly is sealed to the master cylinder bore (15) by a primary seal (54) comprising an elastomeric seal ring (51) seated in a PTFE cup (52) which supports a radially peripheral surface of the elastomeric ring and its axial side adjacent the piston, an outer peripheral margin of the PTFE cup being supported by a PTFE backing ring (53).

12. An assembly as claimed in claim 1 characterised in that the piston assembly comprises a push rod (36) and a piston body (37) secured to an axially inner end of the push rod, wherein the inner periphery (58) of the rolling diaphragm (56) is trapped between the push rod (36) and the piston body (37).

13. An assembly as claimed in claim 1 characterised in that the master cylinder and reservoir are formed from a single moulding (11) having a through bore (13,14,15,16) comprising a series of stepped different diameter portions, the larger diameter portion (16) forming the reservoir, a smaller diameter portion (15) forming the master cylinder, and a smallest diameter portion (13) forming the master cylinder outlet port.

14. An assembly as claimed in claim 1 characterised in that the reservoir (12) is surrounded by a housing (62,63,65) to protect it from its environment.

15. An assembly as claimed in claim 14, characterised in that the housing comprises a plurality of segmented parts (62,63) that make a cuplike shield, and a casing (65) to keep said parts in assembly together.

16. An assembly as claimed in claim 15 characterised in that the piston assembly includes an end portion of a push rod (36), and the push rod has two axially spaced annular grooves (72,73) thereon which mark the desirable limits of movement of the push rod relative to a dust shield.

17. An assembly as claimed in claim 16 and further characterised in that an annular spring clip (73) is located in one of said grooves (72,73) which holds the push rod (36) in an at-rest condition during the shipment of the master cylinder.

18. An assembly according to claim 1 characterised in that a sealing system (37,51,52,53) of the piston assembly (35) and the inside of the bore are arranged to allow the piston assembly to oscillate around a point (C) on the axis of the master cylinder, said point (C) being approximately at an the intersection with a sealing plane of the sealing system.

19. An assembly as claimed in claim 17 characterised in that a sealing system (37,51,52,53) of the piston assembly (35) and the inside of the bore are arranged to allow the piston assembly to oscillate around a point (C) on the axis of the master cylinder, said point (C) being approximately at an intersection with a sealing plane of the sealing system and in that an end wall (64) of the shield has a spherical outer face (68) and a spherical inner face (69) which cooperates with a spherical abutment face (70) of the push rod (36), these different spherical parts having as their approximate centre said point (C) so that at one inner limit of movement of the push rod (36) the annular ring clip (73) seats against the spherical outer face (68) and that at the outer limit of the movement the spherical abutment face (70) of the push rod seats against the spherical inner face (69); a play established between a cruciform opening (66) in the end wall (64) and a cruciform section (67) of the push rod (36) delimiting the oscillations of the piston assembly.

* * * * *